Oct. 7, 1930.  H. H. LOWENSTEIN  1,777,729
ENTERTAINING NOVELTY
Filed April 16, 1928  2 Sheets-Sheet 1
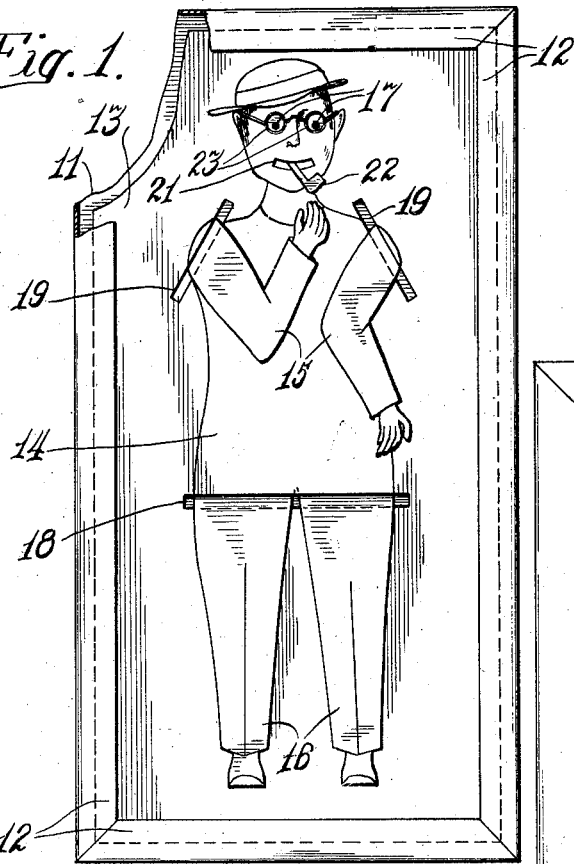
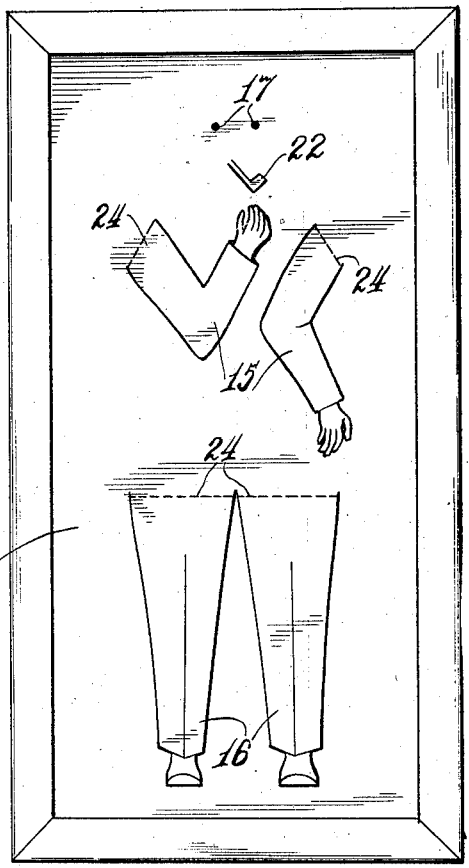
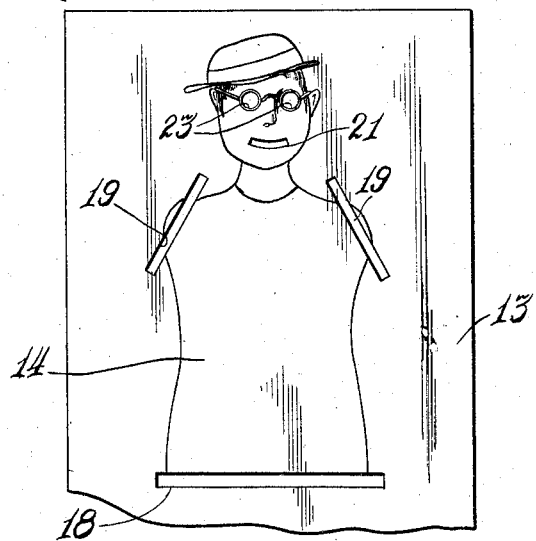
Inventor
Herman H. Lowenstein
Attorney Oct. 7, 1930.  H. H. LOWENSTEIN  1,777,729
ENTERTAINING NOVELTY
Filed April 16, 1928   2 Sheets-Sheet 2

Inventor
Herman H. Lowenstein
Daniel Brennan
Attorney

Patented Oct. 7, 1930

1,777,729

UNITED STATES PATENT OFFICE

HERMAN H. LOWENSTEIN, OF CHICAGO, ILLINOIS, ASSIGNOR TO REGENSTEINER CORPORATION, OF CHICAGO, ILLINOIS, A CORPORATION OF ILLINOIS

ENTERTAINING NOVELTY

Application filed April 16, 1928. Serial No. 270,334.

My invention relates to improvements in entertaining novelties and more particularly to novelties having animated characters thereon.

It is an object of this invention to provide a new and improved entertaining medium having a representation reproduced thereon, as by printing, which will be animated upon manipulation of the medium.

Another object of the present invention is to provide a novel medium having a representation thereon, and having parts of said representation adapted to co-operate with each other so as to impart relative motion to certain parts of the representation.

A further object of the invention is to provide a novel entertaining medium of the above character which may be readily applicable for use on valentines, greeting cards, in books, or in connection with advertising matter, or the like.

A still further object of the invention resides in the provision of a novel entertaining medium of the above character which may be manufactured cheaply.

The invention consists of a novel entertaining medium having a plurality of parts assembled for co-operative engagement with each other, one of said parts being provided with cut-out portions adapted to extend through slotted apertures in the other as a means for producing animation in a representation reproduced thereon, upon relative movement between said parts.

In the accompanying drawings:

Fig. 1 is a front elevational view of a medium embodying the features of the present invention.

Fig. 2 shows a like view of the backing sheet of the medium.

Fig. 3 is a fragmentary elevational view of the front sheet.

Figure 4:
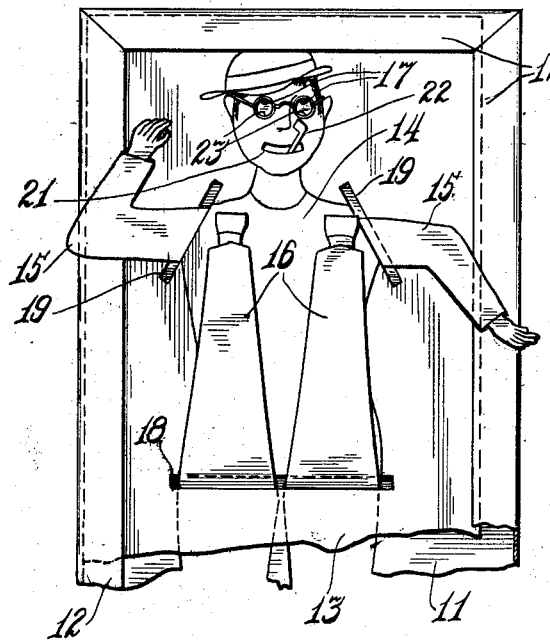
Fig. 4 is a view similar to Fig. 1, but showing the parts in a changed position.

As illustrated in the drawings, the invention consists of a medium having front and back sheets of material, preferably made of heavy paper or cardboard, the front sheet being provided with an arrangement of slots and holes and having a representation thereon, and the rear sheet being provided with cut-out portions extending through said slots and supplementing the representation, the cut-out portions being movable upon relative movement between the sheets so as to give the representation the appearance of being animated.

In the preferred form of the invention illustrated in the drawings, the medium is made up of two sheets of material placed together, one of said sheets being smaller than the other. The edges of the larger sheet are folded over so as to overlie the edges of the smaller sheet, which will have a free sliding movement within the area defined by said folded edges.

The edges of the larger sheet, which are folded in the above manner, are of sufficient width to overlie the edge of the smaller sheet at all times, irrespective of its position therein. A representation is reproduced on the medium thus formed, parts of said representation being reproduced on each sheet, and one of said sheets is provided with dependents which extend through apertures in the other sheet to supplement the representation.

In the particular form of the invention shown in Figs. 1 to 4, inclusive, I have provided a backing sheet 11 having its edges 12 folded over upon a front sheet 13, as a means of operatively connecting the two together. The front sheet 13 is smaller than the backing sheet 11 so as to be adjustable thereon within the confines of the edges 12. Reproduced on the front sheet 13 is a portion of a representation 14, the head and body of a man being illustrated. The remaining parts of the representation, such as the arms 15, the legs 16, and the eyes 17, are reproduced on the backing sheet 11.

The arm and leg portions may be formed on the backing sheet 11 in any suitable manner, but preferably are severed therefrom along their outline except at their normal junction with the body, along edges 24, and project through suitable apertures in the front sheet 13. In the present instance, the legs 16 extend through the transverse slot 18 located at the lower extremity of the torso of the man, and the arms 15 extend through oppositely inclined diagonal slots 19 which are located at the shoulder portions of the representation. Preferably a slot 21 is also provided at the mouth portion of the representation, and a pipe 22, or the like, extends therethrough from the backing sheet 11 in the same manner as the arm and leg portions. To permit the eyes 17 to be viewed by the observer, holes 23 are provided in the front sheet.

With the medium in assembled position, as shown in Figs. 1 and 4, any relative sliding movement of the sheets will impart, by reason of the slotted openings therein, motion to the arm and leg portions 15 and 16, by causing them to flex on their unsevered edges 24. A like motion will also be imparted to the pipe 22, and the eyes 17 will present the appearance of rolling about within the holes 23.

One of the positions adapted to be assumed by the movable parts of the representation, upon movement of either sheet, is shown in Fig. 4, wherein the front sheet 13 is located in its extreme upper left position. With the sheets in this position, the arm and leg portions of the representation have been folded over along their unsevered edges 24, to assume the position shown. In Fig. 1 the front sheet 13 is centrally located within the backing sheet and the pendent portions of the representation are lying in their normal position.

It will be readily understood that, with a medium of this type, the animated portions of the representation will assume almost any desired position or, by continuous relative manipulation of the sheets, will present an animated figure having parts thereof constantly in motion.

Figure 6:
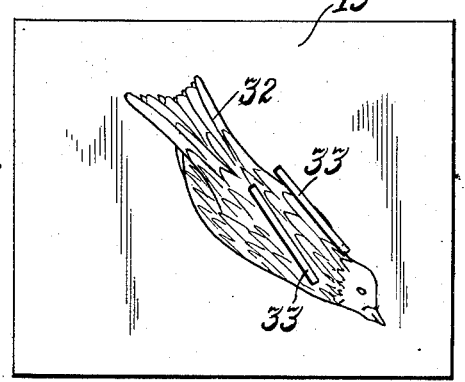
Fig. 6 is a view of just the front sheet of the medium illustrated in Fig. 5.
Figure 5:
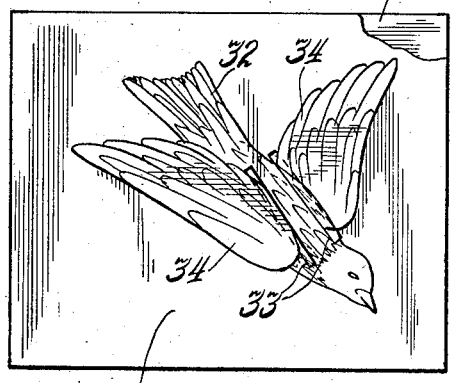
Fig. 5 is a front elevational view of a modified form of the invention.
Figure 7:
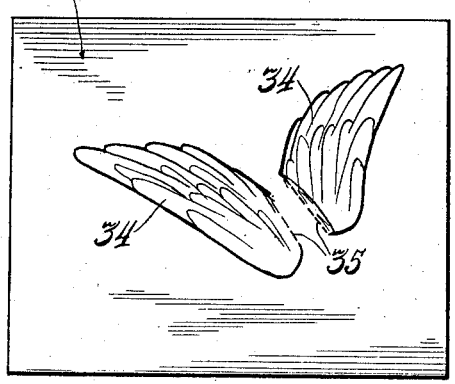
Fig. 7 is an elevational view of the backing sheet of the medium shown in Fig. 5.

In the form of the invention shown in Figs. 5 to 7, inclusive, I have shown a medium somewhat similar to that previously described, wherein the two sheets of material making up the medium, are of the same size, each of said sheets having parts of a representation reproduced thereon. In the illustration, the front sheet 13 and backing sheet 11 are made of the same size, and the body 32, of a bird, is reproduced on the front sheet 13, said sheet being provided with slotted apertures 33. The wing portions 34, of the representation are reproduced on, and except along the score lines 35, are severed from the backing sheet 11. These pendent portions extend through the slotted apertures 33 in the front sheet to supplement the representation on said sheet.

The two sheets, 11 and 13, are held together by reason of the interlocking of the wing portions 34 with the front sheet, and upon relative manipulation of either sheet the wings 34 will be caused to rise and fall in a manner similar to those of a bird in flight.

While but two embodiments of the invention have been illustrated, it is apparent from the foregoing description, that the principle involved is adaptable to a wide variety of mediums wherein it is desired to produce animation in objects reproduced thereon.

I intend the invention to cover all modifications and variations falling within the spirit and scope of the invention as expressed in the appended claims.

I claim:

1. In a medium of the character described, a backing sheet having its edges folded over; a relatively smaller front sheet mounted within said folded edges for universal sliding movement on said backing sheet; a representation reproduced in part on said front sheet; dependent portions on said backing sheet; parts of said representation being reproduced on said dependent portion; slits in the front sheet; and the dependent portions extending through and being moved by engagement with said slits for animating said representation upon sliding said sheets relative to each other.

2. In a medium of the character described, a backing sheet having dependent portions and having its edges folded over, a front sheet mounted on said backing sheet within the folded edges and having a free sliding fit therein, said front sheet having slotted apertures, parts of a representation being reproduced on said front sheet, the remainder of said representation being reproduced on said dependent portions, said dependent portions extending through and cooperating with said slotted apertures whereby they are moved relative to said sheets for animating said representation upon manipulation of either or both of said sheets.

3. In a medium of the character described, in combination, a backing sheet and a front sheet, each sheet having parts of a representation reproduced thereon, said front sheet being mounted on the said backing sheet and having a plurality of holes and slotted apertures, said backing sheet having its edges folded over to overlie and engage the front sheet to maintain same in operative position therewith, eyes reproduced on said backing sheet adapted to be viewed through said holes, a plurality of dependent portions on said backing sheet, said dependent portions registering with and extending through said slotted apertures in the front sheet for cooperation therewith to supplement and effect animation of the representation thereon.

4. In a medium of the character described, a backing sheet having its edges folded over, a front sheet mounted within said edges for universal sliding movement on said backing sheet, dependent portions on said backing sheet, a representation reproduced on said sheets, parts thereof being reproduced on said dependent portions, said front sheet having non-parallel slits therein for receiving and cooperating with said dependent portions, whereby, upon relative movement of said sheets said dependent portion being moved to effect animation of the representation.

In testimony whereof I affix my signature at 10 South La Salle Street, Chicago, Illinois.

HERMAN H. LOWENSTEIN.